UNITED STATES PATENT OFFICE 2,005,821

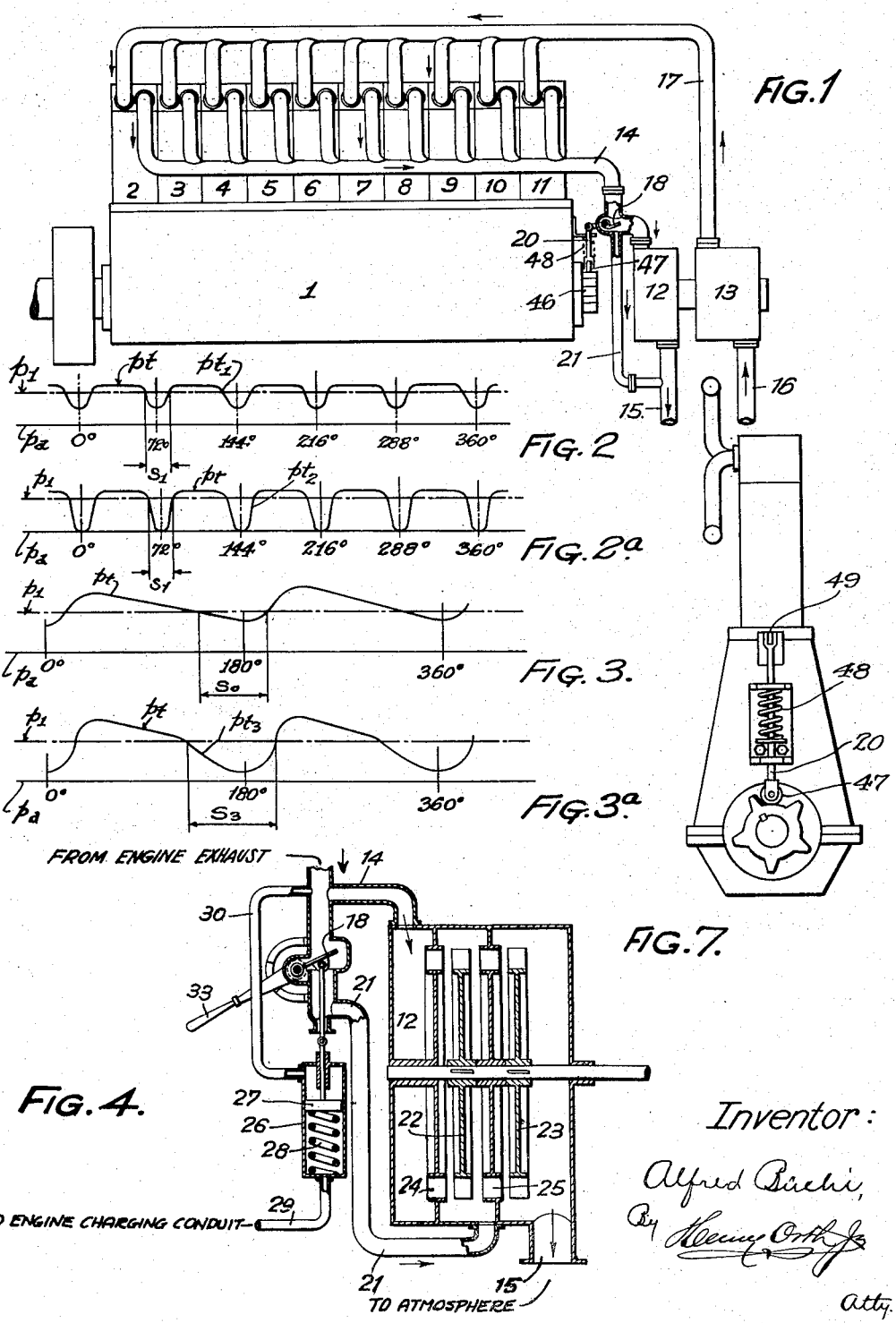

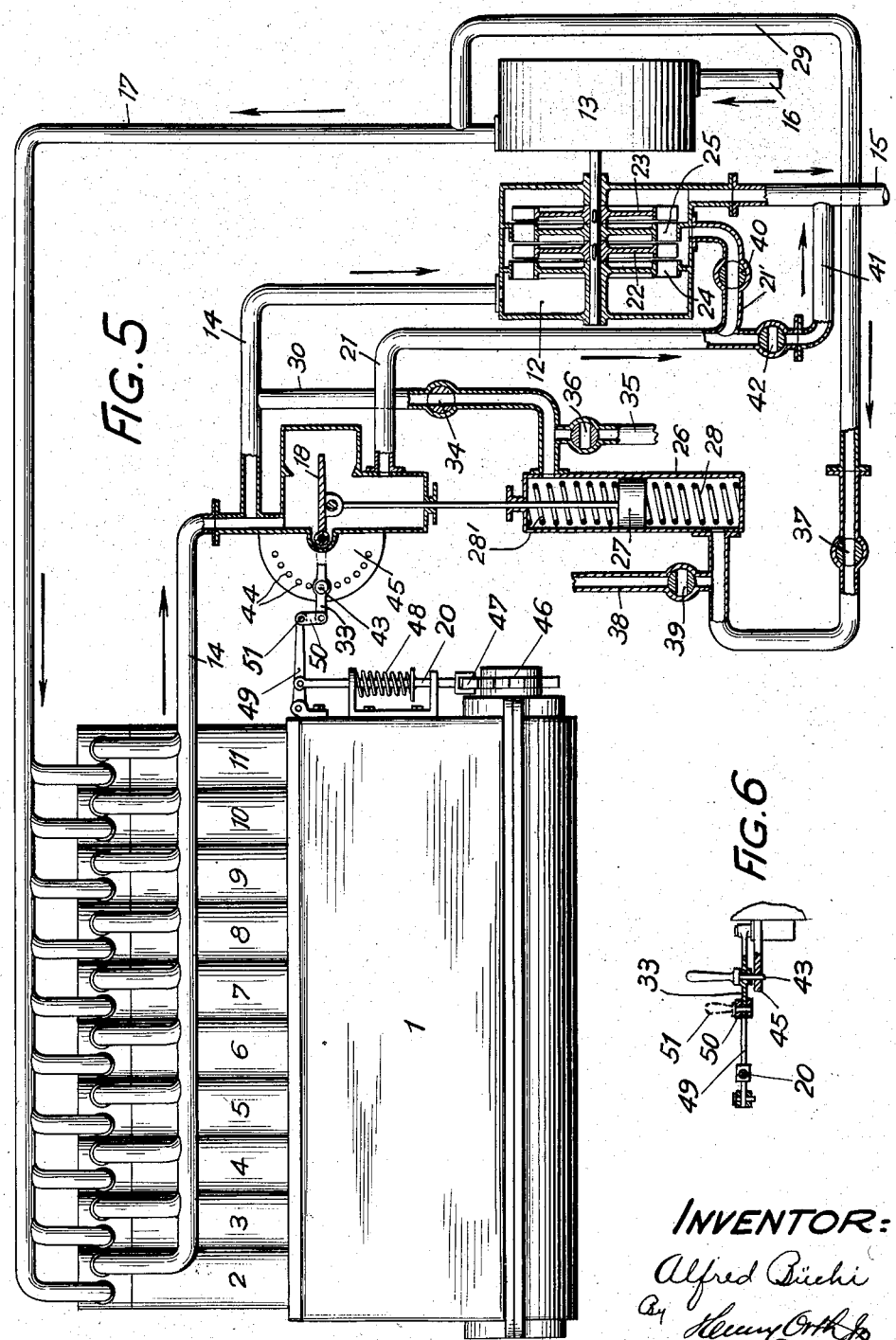

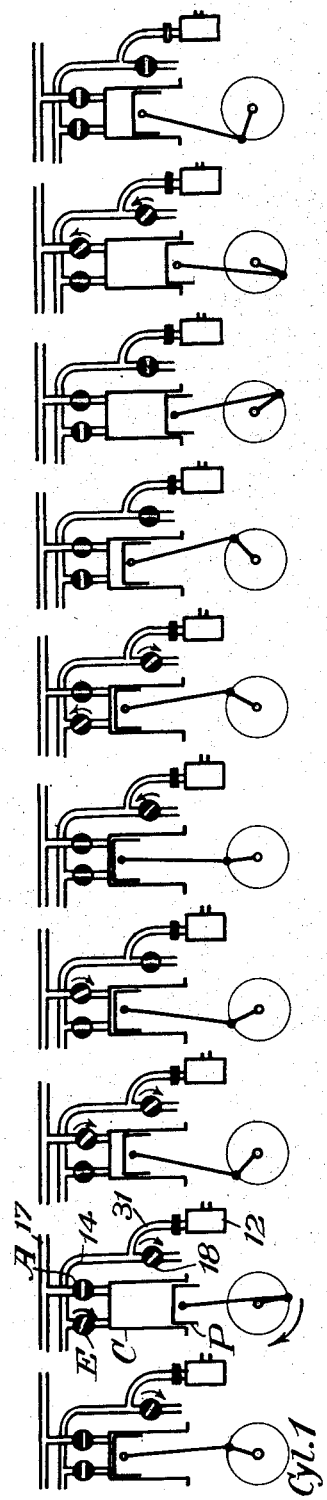
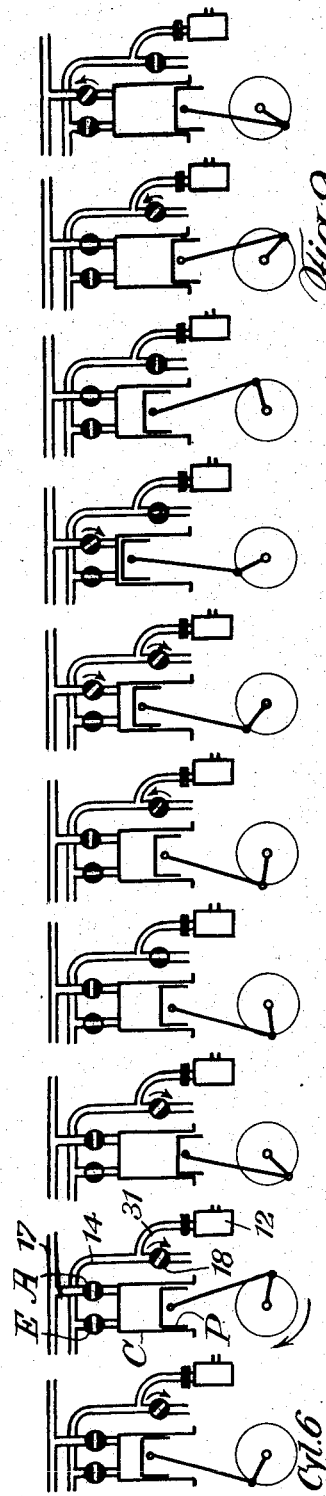
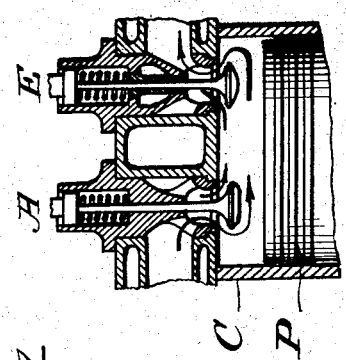
Fig. 8
Fig. 9
Firing order 1-6-2-8-4-10-5-9-3-7

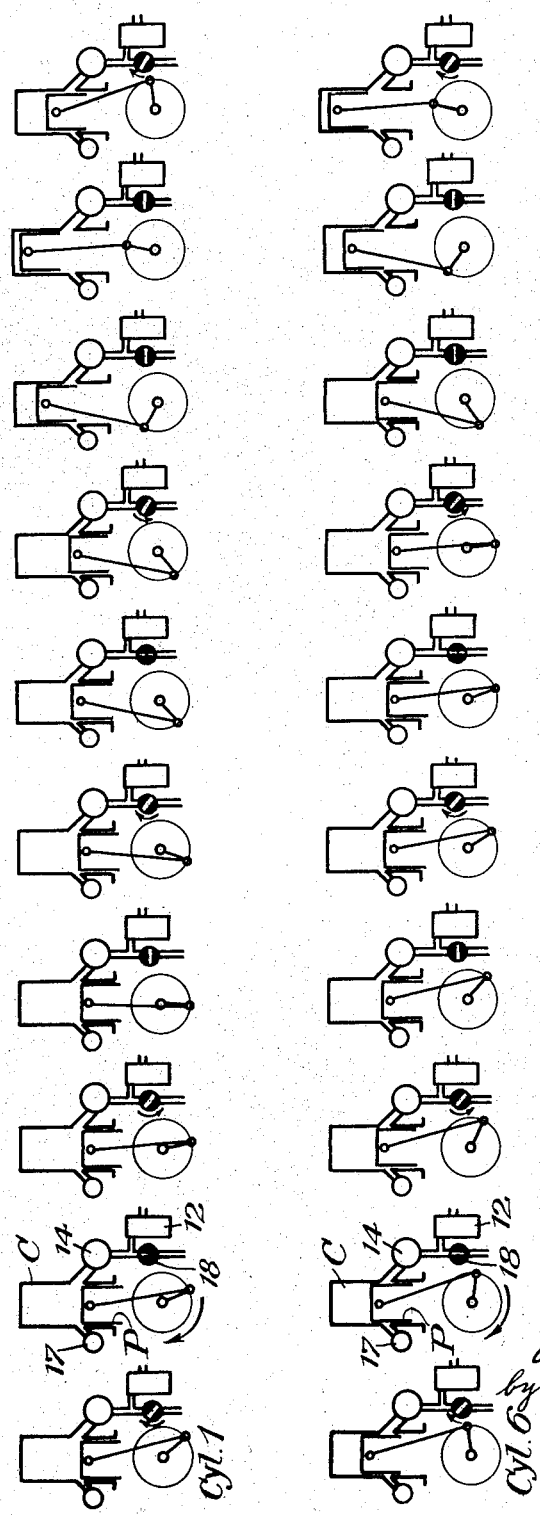

INTERNAL COMBUSTION ENGINE PLANT

Alfred Büchi, Winterthur, Switzerland

Application October 26, 1929, Serial No. 402,722
In Switzerland November 3, 1928

2 Claims. (Cl. 60—13)

This invention relates to internal combustion engines having exhaust turbines for charging purposes i. e. engines which are provided with an exhaust turbine and a charging compressor. In the method according to the invention the pressure of the exhaust gases is influenced in that a decreased pressure is produced in the exhaust conduit between the combustion cylinders and the turbine by periodically opening the said exhaust conduit. For producing the decreased pressure a periodically opening valve member may be arranged between the combustion cylinders and the turbine by way of which exhaust gas may be discharged so that at least a part of the exhaust turbine is by-passed. The method may be so carried into effect that the decreased pressure is produced in the vicinity of the dead-centre following the exhaust period which in two stroke cycle engines is the lower dead center and in four stroke cycle engines is the upper dead center. The decrease of pressure in the exhaust pipe may be of such intensity as to permit of being utilized for scavenging the combustion cylinders or the exhaust conduit respectively by means of the compressed charging air. The periodically actuated valve or gate member may be included in a by-pass which connects the exhaust conduit between cylinder and turbine with the discharge conduit of the turbine which leads to the atmosphere. The periodically actuated valve member may be controlled from the Diesel-engine or by means of the pressure of the exhaust gases or by the charging pressure. Alternatively, the said valve member may be controlled by the mutual influence of the exhaust gas pressure and the charging pressure. The control device of the periodically actuated valve member may be so designed that the latter may be completely opened during the starting and the reversing of the engine and also when the latter runs at light loads.

In the accompanying drawings several embodiments of the device for effecting the method according to the invention are shown by way of example as well as diagrams for illustrating the said method.

Fig. 1 shows schematically a combustion engine system adapted for the purpose of the invention;

Fig. 2 shows a curve indicating the pressure in the exhaust conduit of the engine according to this invention as compared with the charging pressure, the exhaust period being 72° crank angle;

Fig. 2a shows a curve similar to Fig. 2 except that a larger periodic decrease of exhaust pressure is illustrated;

Fig. 3 shows a curve indicating the pressure in the exhaust conduit of the engine according to this invention as compared with the charging pressure, the exhaust period being 180° crank angle;

Fig. 3a shows a curve similar to Fig. 3 except that a larger periodic decrease of exhaust pressure is illustrated;

Fig. 4 shows a modified form of a two stage exhaust turbine;

Fig. 5 illustrates a further embodiment of the invention;

Fig. 6 shows a detail of Fig. 5;

Fig. 7 is an end view of the engines of Figs. 1 and 5 showing particularly mechanism for operating a valve member; and Fig. 8 is a diagrammatic illustration in section of the upper portion of a cylinder of a four-cycle engine of old art showing the positions of the valve during the scavenging period;

Fig. 9 illustrates diagrammatically the relative positions of the inlet and exhaust valves, the pistons and a turbine by-pass valve for a four-cycle engine; and Fig. 10 illustrates diagrammatically the relative positions of the inlet and exhaust valves, the pistons and a turbine by-pass valve for a two-cycle engine.

Referring now to Fig. 1 of the drawings, I denotes a single acting ten cylinder combustion engine comprising the cylinders 2—11. 12 is an exhaust turbine which serves for directly driving the charging compressor 13. The exhaust gases of the combustion engine pass into the turbine 12 by way of the conduit 14 and leave the said turbine through the conduit 15. Atmospheric air is admitted to the charging compressor 13 through the conduit 16. The precompressed charge passes to the cylinders 2—11 of the combustion engine through the conduit 17. The essence of the invention is embodied in the particular parts 12—21. 18 denotes a periodically actuated valve or gate member by means of which communication may be effected between the conduit 14 and the by-pass 21. 47 designates a cam follower which serves for the actuation of the member 18 by means of the rod 20. In the construction shown in Fig. 1 the conduit 21 is connected with the discharge pipe 15 of the turbine which leads to the open. A cam 46 driven by the engine raises the follower 47 and rod 20 against the compression of spring 48 which holds the follower against the cam. When a decreased pressure is to be produced in the conduit 14 the member 18 is opened so that at least a part of the exhaust gases present in the conduit 14 is discharged.

The engine is of the ordinary two or four stroke cycle type and gets the whole charge precompressed. The charge is further compressed in the combustion cylinder, after ignition expansion follows and the combustion gases escape into a gas turbine. These exhaust gases are expanded to substantially atmospheric pressure in the gas turbine, so that in pipe 15 substantially atmospheric pressure prevails. Ahead of the gas turbine a pressure substantially above atmosphere pressure prevails. At the end of the exhaust period the amount of the exhaust gases remaining in the combustion cylinder should be as low as possible. The lower the pressure at this moment is, the smaller is the amount of the remaining exhaust gases. The incoming new charge gets only little heated if there is but a small amount of remaining exhaust gases. When the member 18 which may be a valve, a blast gate or the like is opened the high pressure part of the turbine or the whole turbine respectively is by-passed. Hence the pressure ahead of the turbine drops as soon as member 18 is opened. This pressure drop expands with the velocity of sound (over 1000 ft./sec.) through the piping towards the combustion cylinders. The member 18 is opened every time when one of the combustion cylinders is in the dead center position that follows the exhaust period. With two stroke cycle engines the piston is then in the inner dead center position and with four stroke cycle engines the piston is in the outer dead center position. In the example illustrated in Fig. 1 member 18 would be opened 10 times every 360° crank angle if the internal combustion engine is a two cycle engine and member 18 would be opened 5 times every 360° crank angle if the internal combustion engine is a four cycle engine.

In Fig. 2 the pressure variations under some conditions in the exhaust conduit 14 and the charging conduit 17 are illustrated. $pt$ represents the exhaust pressure in the conduit 14 and $p_1$ the pressure in the conduit 17. In the engine shown in Fig. 1, which is supposed to be a four-cycle engine, after every one-fifth of a revolution, corresponding to a crank angle of 72° ignition takes place. Consequently the dead-centres at the end of the exhaust periods follow each other also in intervals corresponding to an angular displacement of the cranks of 72°. According to the invention, in consequence of the opening of the member 18 in the vicinity of the said dead centres, a decrease of pressure is produced. $pt_1$ indicates a small decrease of this kind. In Fig. 2a, line $pt_2$ indicates a large pressure decrease. The pressure $pt_2$ falls down to the atmospheric pressure $pa$. Thus the exhaust pressure $pt$, falls below the charging pressure $p_1$ during the interval $s_1$ so that during the corresponding time interval the combustion cylinders are scavenged by charging air.

A similar decrease of the exhaust pressure and a scavenging may also be obtained with two cycle engines. This is accomplished by simultaneously uncovering the inlet and exhaust slots at the end of the combustion stroke as disclosed in page 1062 of the "Zeitschrift des Vereins deutscher Ingenieure" volume 70, No. 32, dated August 7, 1926.

In four cycle engines this decrease of the exhaust pressure is effected in the conventional manner by keeping the inlet and exhaust valves of the cylinder simultaneously open during the scavenging period as illustrated in Fig. 8 of the accompanying drawings and supported in principle by a prior publication in the Swiss Patent No. 133,562. In this Figure 8, A refers to the admission valve, E to the exhaust valve and C to the cylinder.

Figs. 3 and 3a illustrate the pressure conditions in the exhaust conduit and intake manifold for a four-cylinder four-stroke cycle engine having exhaust periods of approximately 180° crank angle. Fig. 3a illustrates the possibility of increasing the period as well as the amount of the reduction of the exhaust pressure below the charging pressure. It will be noted that the pressure line $pt_3$ extends further below line $p_1$ (charging pressure) than line $pt$ (Fig. 3) and that the period $s_3$ during which the exhaust pressure is below charging pressure is longer than period $s_0$ (Fig. 3). $pt_3$ represents the exhaust pressure when the valve 18 opens every 180°.

In the modified form of the two stage exhaust turbine shown in Fig. 4, 22, 23 denote the runners and 24, 25 the corresponding guide apparatus. The by-pass 21 leads from the conduit 14 to the front side of the guide apparatus 25 so that the exhaust gases passing through the same are enabled to transmit energy to the second wheel 23. In this type of construction the valve member 18 is displaceable by the piston 27 which slides in the cylinder 26. The one side of the piston 27 is acted upon by the pressure of the exhaust gases in the conduit 30 and the other side by the charging pressure in the conduit 29. The latter side is further influenced by the spring 28. The described device permits of pneumatically actuating the valve member 18 in such a way that when the charging pressure surpasses a certain amount the member 18 is opened and the decrease of pressure in the exhaust conduit sets in. With the exhaust pressure rising, which is the case when a combustion cylinder discharges in a relatively small exhaust conduit, the member 18 is automatically closed again.

Besides, in Fig. 4 a control member 33 is arranged by means of which the member 18 is manually operable so that the automatic operation may be suspended and the valve manually held open to by-pass part of the turbine when desired, as for instance, during starting of the engine.

In the constructional example illustrated in Figs. 5 and 6 an arrangement is shown by which the valve or gate member may be controlled by the mutual influence of the pressure in the charging compressor and the exhaust pressure ahead of the turbine. The valve or gate member 18 is operated by a piston 27 displaceable in the cylinder 26, the movements of the piston 27 are influenced by the springs 28 and 28'. One end of the cylinder 26 is connected by the conduit 30 to the exhaust pipe 14, a valve 34 is inserted in the conduit 30. A conduit 35 branches off the conduit 30 and leads into the atmosphere, a valve 36 is inserted in the conduit 35. The lower end of the cylinder 26 is connected by the conduit 29 to the discharge conduit 17 of the compressor 13, a valve 37 is inserted in the conduit 29, and a conduit 38 leading to the atmosphere and having a valve 39 branches off the conduit 29. The conduit 21 has two branches, one branch 21' leads to the guide apparatus 25 of the exhaust turbine 12 and has a valve 40 inserted in it and the other branch 41 is connected to the discharge pipe 15 of the turbine and is provided with a valve 42.

In Fig. 5 the valves 34, 37 and 40 are open, the valves 36, 39 and 42 are closed. The exhaust pressure in the conduits 14 and 30 acts on the upper side of the piston 27 and the pressure of the compressed air on the lower side of said piston. Thus when the exhaust pressure is higher than the charging air pressure the valve or gate member 18 is closed, but as soon as the exhaust pressure drops below the pressure of the compressed air the piston 27 is moved in the upward direction and the eduction member 18 is opened whereby a further decrease of the exhaust pressure occurs as part of the exhaust gases are by-passed through pipe 21 into a low pressure stage of the turbine 12, or, when the valve 40 is closed and the valve 42 opened, into the atmosphere. Before valve or gate member 18 is opened all the exhaust gases are conveyed through pipe 14 to the first stage of the turbine. After the valve or gate member is opened, part of the exhaust gases pass through pipe 21 into another stage of the turbine where the pressure is lower, or by opening valve 42 may pass directly into the exhaust conduit 15 leading from the turbine to the atmosphere. The pressure in pipe 14 must therefore become lower when valve or gate 18 is open.

By these means the pressure in pipe 14 diminishes much quicker and the minimum pressure in the exhaust pipe 14 is much lower than without valve member 18, as can be readily seen from Figs. 2, 2a, 3 and 3a, respectively. From Figs. 2, 2a, 3 and 3a can be seen that the longer the valve member 18 is open, the longer the air pressure is above the exhaust pressure.

In the example shown, Fig. 5, all the exhaust gases pass through the low pressure stage 25 of the exhaust turbine and from there through the common pipe 15 to the atmosphere. Blower 13 draws in through pipe 16 and delivers into pipe 17.

The valves 34 and 37 serve for selectively closing the conduits 30 and 29 respectively when it is desired to influence the device 26 solely by the charging or the exhaust pressure respectively. If both valves are closed this device is rendered entirely inoperative. In the latter case the valves 36 and 39 serve for completely emptying the gas or air spaces with which they are connected and prevent at the same time pressure from unintentionally arising in the device 26 so as to influence the same due to possible leakage in the valves 34 and 37.

In Fig. 5 valves 34, 37 and 40 are shown in the open position, valves 36, 39 and 42 in the closed position. Piston 27 in cylinder 26 is exposed to the force of spring 28 and the charging air pressure on one side and to the force of spring $28^1$ and the exhaust gas pressure on the other side. The valve 18 is open so long as the combined force of spring 28 and the charging air pressure on the lower side of piston 27 is bigger than the forces on the upper side. By closing valve 37 and opening valve 39 atmospheric pressure prevails in the lower side of the piston and the only force acting on piston 27 from this side is the force of spring 28. The force pushing valve 18 upwards is therefore smaller. The time during which the forces on the lower side of piston 27 are bigger than the force on the upper side becomes hence shorter and therefore also the time during which valve 18 is open.

With valve 42 closed and valve 40 open, a pressure equal to that in the low pressure part 25 of the turbine 12 prevails in pipe 21. When opening valve 18, the pressure in exhaust pipe 14 can therefore not fall below the pressure of the low pressure turbine part. Closing valve 40 and opening valve 42 connect pipe 21 directly to the atmosphere, so that substantially atmospheric pressure may be reached in pipe 14 when opening valve 18.

Instead of working the valve 18 pneumatically, valve 18 may be operated mechanically by means of cams 46, roller 47, pushrod 20, links 49, 50 and 33. This latter method may also be provided for and applied in case of a break down of the pneumatic operating device.

The charging pressure increases only when the compressor and turbine rotate at a higher speed. The turbine rotates at a higher speed only after the exhaust pressure is increased. Thus a charging pressure rise is only possible together with an exhaust pressure rise. The result, that the member 18 would remain open will therefore not obtain.

In order to fix the valve or gate member in any desired position the hand lever 33 is provided with an eye through which a pin 43 is thrust, the latter passing further through any one of the perforations 44 provided on the plate 45 as is illustrated in Fig. 6.

By choosing springs 28 and 28' of suitable power the pressure required to operate the value or gate member may be varied at will and may be chosen higher or lower than the actual pressure of the compressed air or of the exhaust gases respectively.

Besides the pressure-controlled means for opening the valve or gate member 18 mechanical means for the same purpose are provided in the constructional example shown in Fig. 5, which may, for instance, be used when the pressure-controlled means are out of order. These mechanical means comprise a cam 46, similar to cam 19 hereinbefore referred to on the engine shaft with which a roller 47 at the lower end of a rod 20 cooperates. A spring 48 presses the roller 47 into engagement with the cam 46. The upper end of the rod 20 is connected by means of the one armed lever 49 and link 50 to the handle 33 of the valve or gate member 18. The pin 51 coupling the lever 49 and the link 50 is placed in position if this mechanical device has to be operative and is withdrawn if the pressure-operated means has to operate the valve or gate member 18.

To get the pressure drop according to $pt_1$ valve 40 is open and valve 42 is closed, the exhaust gases by-pass the high pressure part of the turbine only and escape into a pressure stage of the turbine with a lower pressure but still above atmospheric pressure.

To get the pressure drop according to $pt_2$ valve 40 is closed and valve 42 is opened. The exhaust gases by-pass thereby the whole turbine and escape into conduit 15, where substantially atmospheric pressure prevails. Such a decrease of pressure in the exhaust pipe as described is specially advantageous at the end of an exhaust period in that it permits of emptying the combustion cylinders of the exhaust gases to a large extent. Furthermore, it permits of creating such a large decrease of pressure which lasts for a time interval of such length that a more effective scavenging of the combustion cylinders is effected than with the means heretofore known.

I claim:

1. In a power plant comprising an internal combustion engine having a plurality of cylinders, a turbine driven by the exhaust gases of said engine, a compressor for supplying compressed air to the combustion cylinders for charging and scavenging purposes, an air conduit interposed between said internal combustion engine and said compressor, said compressor driven by said exhaust turbine, an exhaust conduit interposed between internal combustion engine and turbine, a plurality of combustion cylinders exhausting into said exhaust conduit, a by-pass connecting said exhaust conduit to the atmosphere, a valve in said by-pass, means for opening said valve when the pressure in said exhaust conduit exceeds a predetermined pressure, a cylinder in which said valve carries a piston therein, a conduit from one of said cylinders to said cylinder on one side of said piston, a conduit from the other side of said cylinder to said exhaust conduit whereby said piston is subjected to both the pressure in said cylinder and the pressure in said exhaust conduit.

2. In a power plant comprising an internal combustion engine having a plurality of cylinders, a turbine driven by the exhaust gases of said engine, a compressor for supplying compressed air to the combustion cylinders for charging and scavenging purposes and driven by said exhaust turbine, an exhaust conduit interposed between internal combustion engine and turbine, into said exhaust conduit exhausting a plurality of combustion cylinders, a by-pass connecting said exhaust conduit to the atmosphere, a valve therein, a piston therein, a cylinder in which said piston reciprocates, a conduit from one of said cylinders to said cylinder on one side of said piston, a conduit from the other side of said cylinder to said exhaust conduit, and charging means for said cylinders at the other side of said piston acting upon said piston.

ALFRED BÜCHI.